US010030738B2

(12) United States Patent
Ueki et al.

(10) Patent No.: US 10,030,738 B2
(45) Date of Patent: Jul. 24, 2018

(54) VIBRATION-DAMPING DEVICE

(71) Applicant: BRIDGESTONE CORPORATION, Tokyo (JP)

(72) Inventors: Akira Ueki, Tokyo (JP); Masakazu Nagasawa, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/118,138

(22) PCT Filed: Jul. 22, 2014

(86) PCT No.: PCT/JP2014/069356
§ 371 (c)(1),
(2) Date: Aug. 11, 2016

(87) PCT Pub. No.: WO2015/122034
PCT Pub. Date: Aug. 20, 2015

(65) Prior Publication Data
US 2017/0167564 A1   Jun. 15, 2017

(30) Foreign Application Priority Data
Feb. 17, 2014 (JP) .................. 2014-027649

(51) Int. Cl.
*F16F 13/10* (2006.01)
*B60K 5/12* (2006.01)
(52) U.S. Cl.
CPC .......... *F16F 13/107* (2013.01); *B60K 5/1208* (2013.01); *F16F 2222/12* (2013.01)
(58) Field of Classification Search
CPC .. F16F 13/08; F16F 13/10; F16F 13/26; F16F 13/106; F16F 13/107; F16F 9/34; F16F 2230/00; B60K 5/1208; B60K 5/1233
(Continued)

(56) References Cited

U.S. PATENT DOCUMENTS
4,618,128 A   10/1986 Hartel et al.
4,676,489 A   6/1987 Hofmann et al.
(Continued)

FOREIGN PATENT DOCUMENTS
CN   101460762 A   6/2009
CN   102803783 A   11/2012
(Continued)

OTHER PUBLICATIONS

Communication dated May 17, 2017 from U.S. Patent & Trademark Office in counterpart U.S. Appl. No. 14/894,574.
(Continued)

*Primary Examiner* — Robert A. Siconolfi
*Assistant Examiner* — San M Aung
(74) *Attorney, Agent, or Firm* — Sughrue Mion, PLLC (57) ABSTRACT

A partitioning member (16) of a vibration-damping device (10) is provided with a communication chamber (30), a first communication hole (31) and a second communication hole (32). The first communication hole (31) and the second communication hole (32) are arranged to be offset from each other in the axial direction (O). The first communication hole (31) is formed by the inside of a first protruding tube (31*a*) that protrudes into the communication chamber (30) from the first wall surface (30*a*). The second communication hole (32) is formed by the inside of the second protruding tube (32*a*) that protrudes into the communication chamber (30) from the second wall surface (30*b*). By including the configuration as described above, simplification of structure can be achieved.

2 Claims, 3 Drawing Sheets (58) Field of Classification Search
USPC .... 267/140.13, 35, 152, 220, 140.11, 140.14
See application file for complete search history.

(56) References Cited

U.S. PATENT DOCUMENTS

| | | | |
|---|---|---|---|
| 4,739,962 A | | 4/1988 | Morita et al. |
| 4,773,634 A | | 9/1988 | Hamaekers |
| 4,781,362 A | | 11/1988 | Reuter et al. |
| 4,811,934 A | | 3/1989 | Bebermeier et al. |
| 4,858,879 A | * | 8/1989 | Miyamoto ........... B60K 5/1233 |
| | | | 248/636 |
| 4,877,225 A | | 10/1989 | Noguchi et al. |
| 4,903,951 A | | 2/1990 | Miyamoto et al. |
| 5,273,262 A | | 12/1993 | Baldini et al. |
| 5,346,192 A | * | 9/1994 | Weltin ................. F16F 13/264 |
| | | | 188/267 |
| 5,398,917 A | * | 3/1995 | Carlson ................. F16F 9/535 |
| | | | 188/267.2 |
| 5,601,280 A | | 2/1997 | Nagaya et al. |
| 2003/0168789 A1 | * | 9/2003 | Kries .................... F16F 13/105 |
| | | | 267/140.13 |
| 2009/0250852 A1 | | 10/2009 | Jones et al. |
| 2009/0283945 A1 | * | 11/2009 | Kojima ................ F16F 13/107 |
| | | | 267/140.13 |
| 2010/0072683 A1 | * | 3/2010 | Saito .................... F16F 13/106 |
| | | | 267/140.13 |
| 2011/0006466 A1 | | 1/2011 | Ichikawa et al. |
| 2011/0042870 A1 | | 2/2011 | Kojima |
| 2012/0139174 A1 | | 6/2012 | Matsumoto et al. |
| 2012/0292837 A1 | | 11/2012 | Hettler et al. |

FOREIGN PATENT DOCUMENTS

| | | |
|---|---|---|
| CN | 202674148 U | 1/2013 |
| DE | 10 2010 048 259 A1 | 5/2012 |
| EP | 0137477 A2 | 4/1985 |
| EP | 0209682 A2 | 1/1987 |
| EP | 0848183 A2 | 6/1998 |
| EP | 2 221 503 A | 8/2010 |
| GB | 2242724 A | 10/1991 |
| GB | 2 402 457 A | 12/2004 |
| JP | 60040841 A * | 3/1985 |
| JP | 60-73147 A | 4/1985 |
| JP | 60-159440 A | 8/1985 |
| JP | 60-164031 A | 8/1985 |
| JP | 61-24560 U | 2/1986 |
| JP | 1-224544 A | 9/1989 |
| JP | 2007-120598 A | 5/2007 |
| JP | 5014329 B2 | 8/2012 |

OTHER PUBLICATIONS

Hideki Yoshitomi et al., "A study on a Valveless Micro-Pump using Fluidic Diode", Tsuyama National College of Technology, 2007, pp. 9-15, No. 49.
International Search Report of PCT/JP2014/061702 dated Aug. 5, 2014.
International Search Report of PCT/JP2014/069356 dated Aug. 19, 2014.
A Restriction/Election Requirement dated Feb. 8, 2017 from the U.S. Patent and Trademark Office in counterpart U.S. Appl. No. 14/894,574.
A Response to the Restriction/Election Requirement dated Mar. 28, 2017 to the U.S. Patent and Trademark Office in counterpart U.S. Appl. No. 14/894,574.
Communication dated Feb. 28, 2017 from the State Intellectual Property Office of the P.R.C. In counterpart application No. 201480075555.0.
A Response (Amendment) filed in response to Final Office Action dated Oct. 27, 2017 to the U.S. Patent and Trademark Office in U.S. Appl. No. 14/894,574.
Communication (Interview Summary) dated Dec. 29, 2017, issued by the U.S. Patent and Trademark Office in related U.S. Appl. No. 14/894,574.
Communication dated Oct. 27, 2017 issued by the United States Patent and Trademark Office in U.S. Appl. No. 14/894,574.
An Amendment in response to Non-Final Office Action dated May 17, 2017 to the U.S. Patent and Trademark Office in counterpart U.S. Appl. No. 14/894,574.
An Office Action (Advisory Action) dated Feb. 7, 2018, which issued during the prosecution of U.S. Appl. No. 14/894,574.
An Office Action dated Jun. 7, 2018, which issued during the prosecution of U.S. Appl. No. 14/894,574.

* cited by examiner

VIBRATION-DAMPING DEVICE

CROSS REFERENCE TO RELATED APPLICATIONS

This application is a National Stage of International Application No. PCT/JP2014/069356 filed Jul. 22, 2014, claiming priority based on Japanese Patent Application No. 2014-027649 filed Feb. 17, 2014, the contents of which are incorporated herein by reference in their entirety.

TECHNICAL FIELD

The present invention relates to a vibration-damping device that is applied to, for example, automobiles, industrial machines, or the like, and absorbs and damps vibrations of vibration generating parts, such as engines.

BACKGROUND ART

As this type of vibration-damping device, for example, the configuration described in the following Patent Document 1 is known. This vibration-damping device includes a tubular first attachment member that is coupled to any one of a vibration generating part and a vibration receiving part, a second attachment member that is coupled to the other thereof, an elastic body that couples both the attachment members together, and a partitioning member that partitions a liquid chamber within the first attachment member having a liquid enclosed therein into a first liquid chamber and a second liquid chamber. This vibration-damping device further includes a first limiting passage and a second limiting passage that allow both the liquid chambers to communicate with each other, a cylinder chamber provided between both the liquid chambers, and a plunger member disposed so as to be movable between an open position and a blocking position within the cylinder chamber.

For example, a plurality of kinds of vibration having different frequencies, such as an idle vibration and a shake vibration, are input to this vibration-damping device. Thus, in this vibration-damping device, the respective resonant frequencies of the first limiting passage and the second limiting passage are set (tuned) to the respective frequencies of the different kinds of vibration. As the plunger member moves between the open position and the blocking position according to the frequency of an input vibration, a limiting passage through which a liquid flows is switched between the first limiting passage and the second limiting passage.

CITATION LIST

Patent Literature

[Patent Document 1] Japanese Unexamined Patent Application, First Publication No. 2007-120598

SUMMARY OF INVENTION

Technical Problem

However, in the related-art vibration-damping device, there is room for improvement in limitation of abnormal noise generated when the plunger member moves, simplification of structure, and facilitation of manufacture.

Additionally, in the related-art vibration-damping device, for example, when an unintended vibration, such as a fine vibration having a higher frequency and an extremely smaller amplitude than the resonant frequency of a limiting passage determined depending on the passage length, cross-sectional area, or the like of the limiting passage, is input, a dynamic spring constant may increase due to clogging of the limiting passage, which may influence the product characteristics of the vibration-damping device, such as the driving comfort of automobiles.

The invention has been made in view of the aforementioned circumstances, and an object thereof is to provide a vibration-damping device that can limit generation of abnormal noise while guaranteeing product characteristics and achieve simplification of structure and facilitation of manufacture.

Solution to Problem

In order to solve the above-described problems, the invention suggests the following means.

A vibration-damping device related to the invention includes a tubular first attachment member coupled to any one of a vibration generating part and a vibration receiving part, and a second attachment member coupled to the other thereof; an elastic body coupling both of the attachment members; and a partitioning member that partitions a liquid chamber within the first attachment member having a liquid enclosed therein into a first liquid chamber and a second liquid chamber. At least any one of the first liquid chamber and the second liquid chamber has the elastic body on a portion of a wall surface thereof. The partitioning member is provided with a communication chamber that allows the first liquid chamber and the second liquid chamber to communicate with each other. A first wall surface and a second wall surface that face each other with the communication chamber disposed therebetween among wall surfaces that form the communication chamber in the partitioning member are separately provided with communication holes that open toward the communication chamber. A first communication hole that is provided in the first wall surface and allows the communication chamber and the first liquid chamber to communicate with each other, and a second communication hole that is provided in the second wall surface and allows the communication chamber and the second liquid chamber to communicate with each other are provided as the communication holes. The first communication hole and the second communication hole are arranged to be offset from each other in an orthogonal direction orthogonal to a facing direction in which the first wall surface and the second wall surface face each other. The first communication hole is formed by the inside of a first protruding tube that protrudes into the communication chamber from the first wall surface.

In this invention, if vibration is input, the liquid flows through the communication chamber between the first liquid chamber and the second liquid chamber when the first attachment member and the second attachment member are relatively displaced while elastically deforming the elastic body.

Here, when the liquid within the second liquid chamber flows toward the first liquid chamber through the communication chamber, the flow speed of the liquid becomes fast. Then, the liquid that has flowed into the communication chamber from the second communication hole flows through the communication chamber in the facing direction, and reaches the first wall surface, and the flow of the liquid is changed by the first wall surface. Thereafter, the flow of the liquid changes so as to face the orthogonal direction along the first wall surface, and then the liquid reaches the outer peripheral surface of the first protruding tube, and flows from the base end of the first protruding tube toward the protruding end thereof along the outer peripheral surface of the first protruding tube. Then, the liquid with the flow which has been changed in this way, and the liquid that flows out from the inside of the communication chamber through the first communication hole to the first liquid chamber collide against each other. Due to the energy loss or the like caused by this collision, the pressure loss of the liquid increases, and vibration is absorbed and damped.

Meanwhile, if the flow speed of the liquid is slow, the pressure loss of the liquid caused when the liquids as mentioned above collide against each other is limited, and the liquid flows smoothly through the communication chamber and a rise in dynamic spring constant is limited.

According to this vibration-damping device, vibration can be absorbed and damped by increasing the pressure loss of the liquid according to the flow speed of the liquid that flows through the communication chamber. For example, when an ordinary vibration, such as an idle vibration or a shake vibration, is input, the vibration can be absorbed and damped regardless of the frequency of the vibration. Therefore, generation of abnormal noise can be limited and simplification of structure and facilitation of manufacture can be achieved, while absorbing and damping a plurality of kinds of vibration with mutually different frequencies.

Additionally, the liquid passes smoothly through the communication chamber and a rise in dynamic spring constant is limited in a state where the flow speed is slow and the pressure loss of the liquid is limited. Therefore, for example, when the flow speed of the liquid is lower than that when an ordinary vibration is input, such as when an unintended vibration, such as a fine vibration having a higher frequency and an extremely smaller amplitude than an ordinary vibration, is input, it is possible to limit a rise in the dynamic spring constant, and the product characteristics of this vibration-damping device can be easily guaranteed.

Additionally, an outer peripheral surface of the first protruding tube may gradually decrease in diameter from a base end of the first protruding tube toward a protruding end thereof.

In this case, the outer peripheral surface of the first protruding tube may gradually decrease in diameter from the base end of the first protruding tube toward the protruding end thereof. Therefore, when the liquid with the flow speed which has become fast flows into the communication chamber from the second communication hole, it is possible to make this liquid flow smoothly from the base end of the first protruding tube toward the protruding end thereof along the outer peripheral surface of the first protruding tube, and the pressure loss of the liquid can be reliably increased.

Additionally, the second communication hole may be formed by the inside of a second protruding tube that protrudes into the communication chamber from the second wall surface.

In this case, since the first communication hole is formed by the inside of the first protruding tube and the second communication hole is formed by the inside of the second protruding tube, the flow speed of the liquid that flows through the communication chamber between the first liquid chamber and the second liquid chamber becomes fast. Therefore, both when the liquid flows from the first liquid chamber through the communication chamber to the second liquid chamber and when the liquid flows from the second liquid chamber through the communication chamber to the first liquid chamber, it is possible to increase the pressure loss of the liquid, and vibration can be reliably absorbed and damped.

Advantageous Effects of Invention

According to the vibration-damping device related to the invention, generation of abnormal noise can be limited and simplification of structure and facilitation of manufacture can be achieved, while guaranteeing product characteristics.

DESCRIPTION OF EMBODIMENTS

Hereinafter, an embodiment of a vibration-damping device related to the invention will be described, referring to FIGS. 1 to 3.

Figure 1:
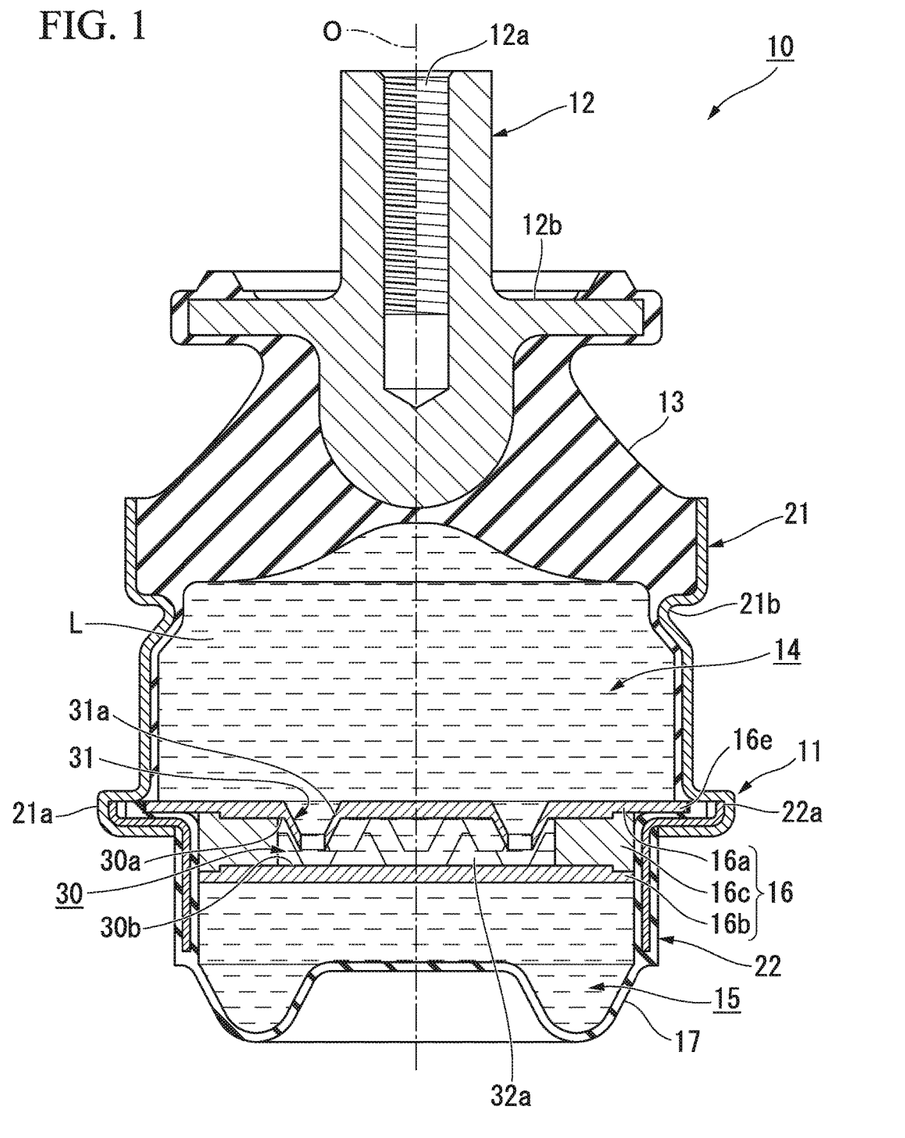
FIG. 1 is longitudinal sectional view of a vibration-damping device related to an embodiment of the invention.

The vibration-damping device 10, as is shown in FIG. 1, includes a tubular first attachment member 11 that is coupled to any one of a vibration generating part and a vibration receiving part, a second attachment member 12 that is coupled to the other thereof, an elastic body 13 that couples both the attachment members 11 and 12 together, and a partitioning member 16 that partitions a chamber within the first attachment member 11 in which a liquid L is enclosed, into a main liquid chamber (first liquid chamber) 14 that has the elastic body 13 as a portion of a wall surface thereof, and an auxiliary liquid chamber (second liquid chamber) 15.

In the shown example, the second attachment member 12 is formed in a pillar shape, and the elastic body 13 is formed in a tubular shape. The first attachment member 11, the second attachment member 12, and the elastic body 13 are disposed coaxially with a common axis. Hereinafter, this common axis is referred to as an axis O (an axis of the first attachment member), a main liquid chamber 14 side in a direction (an axial direction of a communication hole or a direction facing the communication hole) of the axis O is referred to as first side, an auxiliary liquid chamber 15 side is referred to as the second side, a direction orthogonal to the axis O is referred to as a radial direction, and a direction that going around the axis O is referred to as a circumferential direction.

In a case where the vibration-damping device 10 is mounted on, for example, an automobile, the second attachment member 12 is coupled to the engine serving as the vibration generating part. Meanwhile, the first attachment member 11 is coupled to a vehicle body serving as the vibration receiving part via a bracket (not shown), and prevents the vibration of the engine from being transmitted to the vehicle body. The vibration-damping device 10 is of a liquid-enclosed type in which, for example, the liquid L, such as ethylene glycol, water, or silicone oil, is enclosed in a liquid chamber of the first attachment member 11.

The first attachment member 11 includes a first-side outer tube body 21 located on first side in the direction of the axis O, and an second side outer tube body 22 located on the second-side in the direction of the axis O.

The elastic body 13 is coupled to a first side end of the first side outer tube body 21 in a liquid-tight state. A first side opening of the first side outer tube body 21 is blocked by the elastic body 13. The second-side end 21a of the first-side outer tube body 21 is formed with a larger diameter than the other portions. The inside of the first-side outer tube body 21 serves as the main liquid chamber 14. The liquid pressure of the main liquid chamber 14 fluctuates when the elastic body 13 is deformed and the internal volume of the main liquid chamber 14 varies, at the time of the input of vibration.

In addition, an annular groove 21b that extends continuously over a whole circumference is formed in the portion of the first-side outer tube body 21 that is connected to a portion, to which the elastic body 13 is coupled, from the second side.

A diaphragm 17 is coupled to the second-side end of the second-side outer tube body 22 in a liquid-tight state, and the second-side opening of the second-side outer tube body 22 is blocked by the diaphragm 17. A first-side end 22a of the second-side outer tube body 22 is formed with a larger diameter than the other portions, and is fitted into the others-side end 21a of the first-side outer tube body 21. Additionally, the partitioning member 16 is fitted into the second-side outer tube body 22, and the portion of the second-side outer tube body 22 between the partitioning member 16 and the diaphragm 17 serves as the auxiliary liquid chamber 15. The auxiliary liquid chamber 15 has the diaphragm 17 as a portion of a wall surface thereof, and is expanded and contracted when the diaphragm 17 is deformed. In addition, the second-side outer tube body 22 is covered substantially over the entire region with a rubber membrane formed integrally with the diaphragm 17.

A female thread part 12a is formed coaxially with the axis O in first-side end surface of the second attachment member 12. The second attachment member 12 protrudes from the first attachment member 11 to the first side. A flange part 12b that protrudes toward a radial outer side and continuously extends over a whole circumference is formed in the second attachment member 12. The flange part 12b is separated from first side end edge of the first attachment member 11 to the first side.

The elastic body 13 is formed of, for example, a rubber material or the like capable of being elastically deformed, and is formed in a tubular shape that has a gradually enlarged diameter from the first side toward the second side. First-side end of the elastic body 13 is coupled to the second attachment member 12, and the second-side end thereof is coupled to the first attachment member 11.

In addition, an inner peripheral surface of the first side outer tube body 21 of the first attachment member 11 is covered substantially over the entire region with the rubber membrane formed integrally with the elastic body 13.

The partitioning member 16 includes a pair of end surface parts 16a and 16b, and a peripheral wall part 16c.

The pair of end surface parts 16a and 16b is formed in a plate shape, respectively, such that front and back surfaces face the direction of the axis O, and are arranged coaxially with the axis O. A first end surface part 16a located on first side out of the pair of end surface parts 16a and 16b is formed with a larger diameter than the second end surface part 16b located on the second side.

The first end surface part 16a and the second end surface part 16b are arranged at a distance in the direction of the axis O, and are pinch the peripheral wall part 16c in the direction of the axis O therebetween. The peripheral wall part 16c is formed in an annular shape, that opens in the direction of the axis O, and is arranged coaxially with the axis O. As shown in FIG. 2, the peripheral wall part 16c is provided with a protruding part 16d that protrude toward a radial inner side. A plurality of the protruding parts 16d are arranged at predetermined intervals in the circumferential direction, and are pinches in the direction of the axis O by the pair of end surface parts 16a and 16b.

As shown in FIG. 1, the external diameter of the peripheral wall part 16c is equal to the external diameter of the second end surface part 16b. Additionally, the peripheral wall part 16c and the second end surface part 16b are fitted into the first attachment member 11.

A flange part 16e of the first end surface parts 16a that protrudes further to the radial outer side than the peripheral wall part 16c is arranged within the first-side end 22a of the second-side outer tube body 22.

The partitioning member 16 is provided with a communication chamber 30 that communicates with the main liquid chamber 14 and the auxiliary liquid chamber 15. The communication chamber 30 is provided between the first end surface part 16a, the second end surface part 16b, and the peripheral wall part 16c. The inside of the peripheral wall part 16c is blocked from both sides in the direction of the axis O by the first end surface part 16a and the second end surface part 16b. The communication chamber 30 is formed in a flat column shape that is arranged coaxially with the axis O.

Wall surfaces of the partitioning member 16 that form the communication chamber 30 are provided with a first wall surface 30a and a second wall surface 30b that face each other with the communication chamber 30 disposed therebetween. The first wall surface 30a and the second wall surface 30b face each other in the direction of the axis O. The first wall surface 30a is constituted by a wall surface of the first end surface part 16a that faces the second side. The second wall surface 30b is constituted by a wall surface of the second end surface part 16b that faces the first side.

The first wall surface 30a and the second wall surface 30b are respectively provided with communication holes 31 and 32 that open toward the communication chamber 30. As the communication holes 31 and 32, a first communication hole 31 provided in the first wall surface 30a and a second communication hole 32 provided in the second wall surface 30b are included.

The first communication hole 31 allows the communication chamber 30 and the main liquid chamber 14 to communicate with each other, and the second communication hole 32 allows the communication chamber 30 and the auxiliary liquid chamber 15 to communicates with each other. A plurality of the first communication holes 31 and a plurality of the second communication holes 32 are provided, respectively, and the same number of first and second communication holes are provided in the shown example.

Here, the communication hole 31 or 32 is formed by the inside of protruding tube 31a or 32a that protrudes into the communication chamber 30 from the first wall surface 30a or the second wall surface 30b. In the present embodiment, the first communication hole 31 is formed by the inside of the first protruding tube 31a that protrudes into the communication chamber 30 from the first wall surface 30a, and the second communication hole 32 is formed by the inside of the second protruding tube 32a that protrudes into the communication chamber 30 from the second wall surface 30b.

The first protruding tubes 31a and the second protruding tubes 32a all extend in the direction of the axis O. Both of the first communication holes 31 and the second communication holes 32 open to both sides in the direction of the axis O. The axis of the first protruding tube 31a and the axis of the second protruding tube 32a are arranged to be offset from each other in an orthogonal direction along an orthogonal surface orthogonal to the axis O. The first communication hole 31 and the second communication hole 32 are arranged to be offset from each other in the orthogonal direction.

Figure 2:
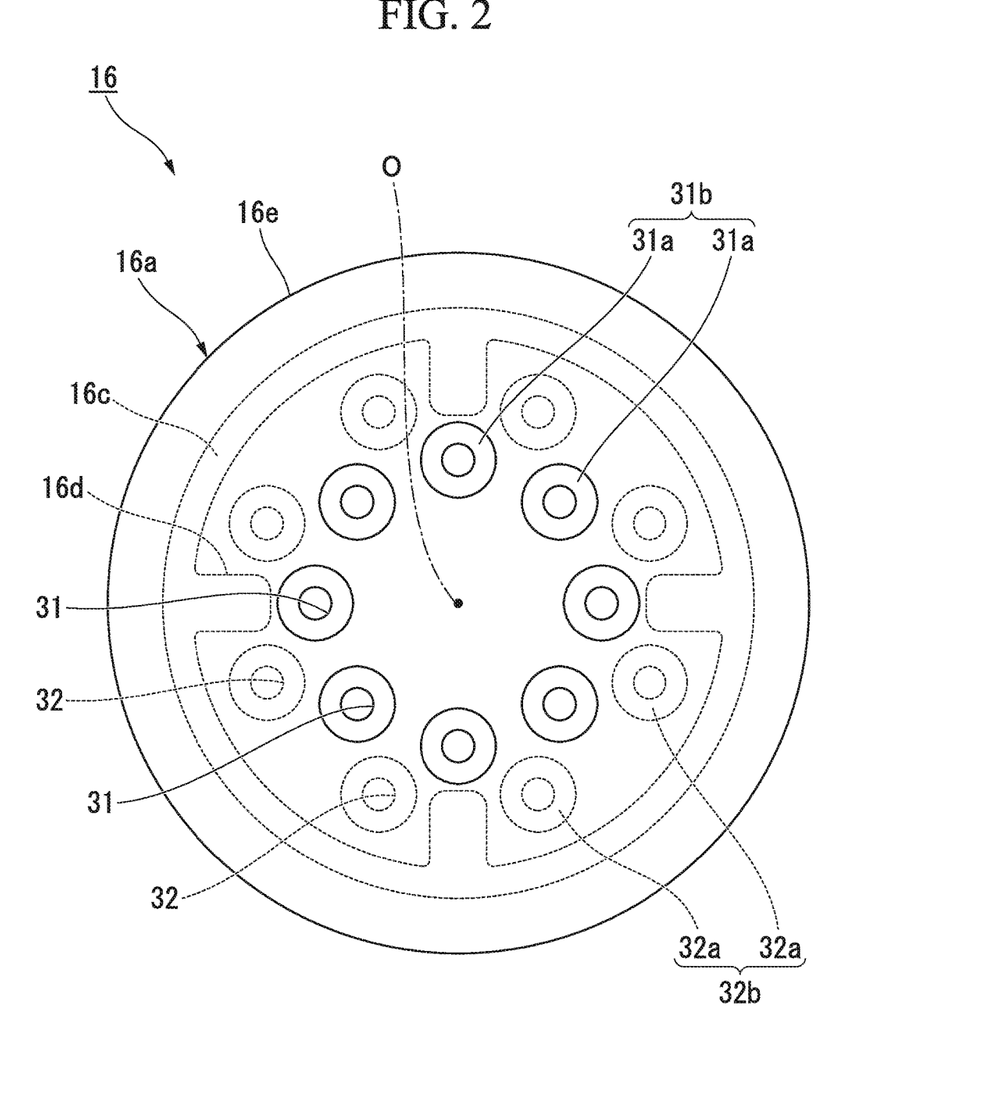
FIG. 2 is a plan view of a partitioning member that constitutes the vibration-damping device shown in FIG. 1.

As shown in FIGS. 1 and 2, the first protruding tube 31a protrudes toward the second side from the first wall surface 30a, and is integrally formed using the same material as the first end surface part 16a. A plurality of the first protruding tubes 31a are arranged at equal intervals in the circumferential direction, and the plurality of first protruding tubes 31a constitute a tube array 31b that is arranged coaxially with the axis O and forms an annular shape.

The second protruding tube 32a is made to have the same shape and size as the first protruding tube 31a. The second protruding tube 32a protrudes toward the second side from the second wall surface 30b, and is integrally formed using the same material as the second end surface part 16b. A plurality of the second protruding tubes 32a are arranged at equal intervals in the circumferential direction, and the plurality of second protruding tubes 32a constitute a tube array 32b that is arranged coaxially with the axis O and forms an annular shape.

The tube array 31b of the first protruding tubes 31a and the diameter of the tube array 32b of the second protruding tubes 32a are different from each other. In the present embodiment, the diameter of the tube array 31b of the first protruding tubes 31a is smaller than the diameter of the tube array 32b of the second protruding tubes 32a. The first protruding tubes 31a and the second protruding tubes 32a are alternately arranged in the circumferential direction.

Figure 3:
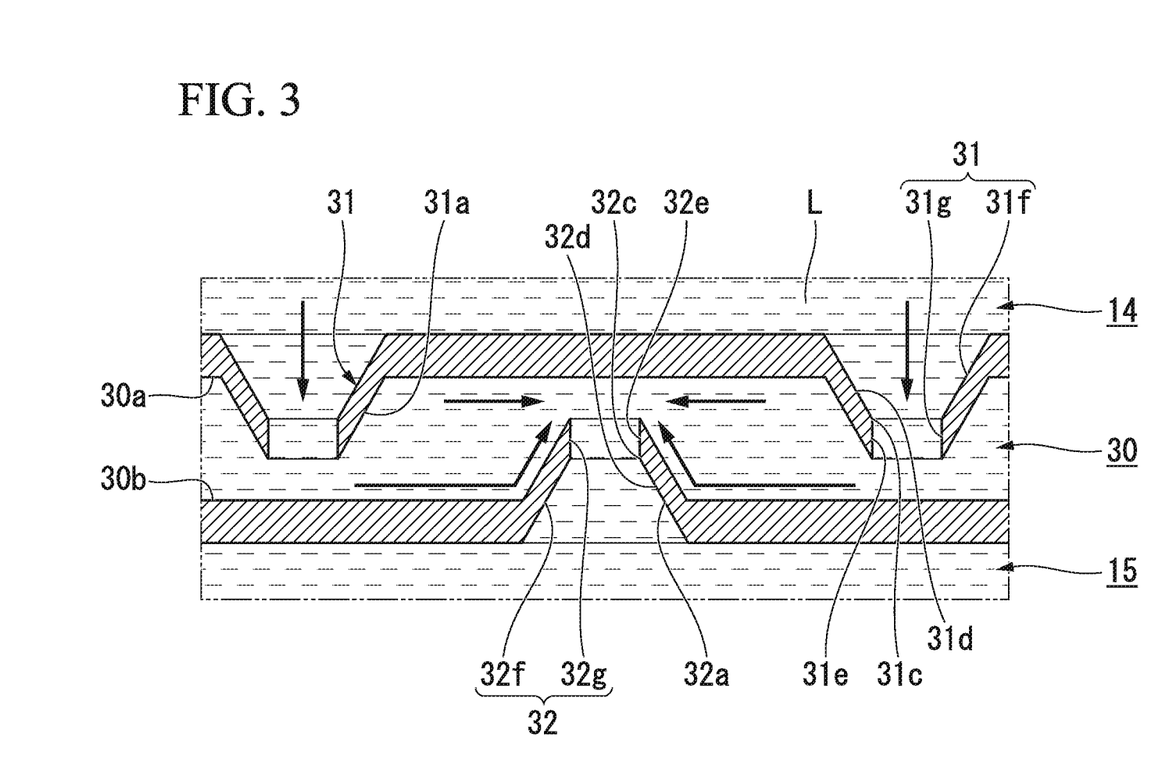
FIG. 3 is a longitudinal sectional view around a partitioning member that constitutes the vibration-damping device shown in FIG. 1.

As shown in FIG. 3, an outer peripheral surface of the first protruding tube 31a gradually decreases in diameter from a base end of the first protruding tube 31a toward a protruding end thereof. In the present embodiment, an inner peripheral surface of the first protruding tube 31a also gradually decreases in diameter from the base end toward the protruding end. Moreover, the entire first protruding tube 31a gradually decreases in diameter from the base end toward the protruding end.

The outer peripheral surface of the first protruding tube 31a smoothly and continuously extends without any stepped part in the direction of the axis O, and linearly extends in a direction that is inclined in the direction of the axis O, in a vertical sectional view passing through the axis of the first protruding tube 31a. The inner peripheral surface of the first protruding tube 31a is partitioned into two of an inclined surface part 31d, and a straight surface part 31e, in the direction of the axis O, via an annular stepped part 31c extending in the circumferential direction of the first protruding tube 31a.

The inclined surface part 31d of the inner peripheral surface of the first protruding tube 31a located closer to the first side than the stepped part 31c gradually decreases in diameter from the first side toward the second side. Meanwhile, the straight surface part 31e located closer to the second side than the stepped part 31c has the same diameter over the entire length in the direction of the axis O. In the vertical sectional view passing through the axis of the first protruding tube 31a, the inclined surface part 31d linearly extends in a direction that is inclined in the direction of the axis O, and the straight surface part 31e linearly extends along the direction of the axis O. The inclined surface part 31d is made larger in the direction of the axis O than the straight surface part 31e. Meanwhile, the straight surface part 31e connects a second-side end edge of the inclined surface part 31d and a second-side end edge of the outer peripheral surface of the first protruding tube 31a together.

The first communication hole 31 is configured such that a first-side larger-diameter part 31f defined by the inclined surface part 31d, and a second-side smaller-diameter part 31g defined by the straight surface part 31e are coupled together in the direction of the axis O. The larger-diameter part 31f decreases in diameter from the first side toward the second side, and the smaller-diameter part 31g is made to have the same diameter over the entire length in the direction of the axis O.

An outer peripheral surface of the second protruding tube 32a gradually decreases in diameter from a base end of the second protruding tube 32a toward a protruding end thereof. In the present embodiment, an inner peripheral surface of the second protruding tube 32a also gradually decreases in diameter from the base end toward the protruding end. Moreover, the entire second protruding tube 32a gradually decreases in diameter from the base end toward the protruding end.

The outer peripheral surface of the second protruding tube 32a smoothly and continuously extends without any stepped part in the direction of the axis O, and linearly extends in a direction that is inclined in the direction of the axis O, in a vertical sectional view passing through the axis of the second protruding tube 32a. The inner peripheral surface of the second protruding tube 32a is partitioned into two of an inclined surface part 32d, and a straight surface part 32e, in the direction of the axis O, via an annular stepped part 32c extending in the circumferential direction of the second protruding tube 32a.

The inclined surface part 32d of the inner peripheral surface of the second protruding tube 32a located closer to the second side than the stepped part 32c gradually decreases in diameter from the second side toward the first side. Meanwhile, the straight surface part 32e located closer to the first side than the stepped part 32c has the same diameter over the entire length in the direction of the axis O. In the vertical sectional view passing through the axis of the second protruding tube 32a, the inclined surface part 32d linearly extends in a direction that is inclined in the direction of the axis O, and the straight surface part 32e linearly extends along the direction of the axis O. The inclined surface part 32d is made larger in the direction of the axis O than the straight surface part 32e. Meanwhile, the straight surface part 32e connects a first-side end edge of the inclined surface part 32d and a first-side end edge of the outer peripheral surface of the second protruding tube 32a together.

The second communication hole 32 is configured such that a first-side larger-diameter part 32f defined by the inclined surface part 32d, and a first-side smaller-diameter part 32g defined by the straight surface part 32e are coupled together in the direction of the axis O. The larger-diameter part 32f decreases in diameter from the second side toward the first side, and the smaller-diameter part 32g is made to have the same diameter over the entire length in the direction of the axis O.

In addition, the first protruding tube 31a and the second protruding tube 32a overlap each other in the direction of the axis O.

Next, the operation of the vibration-damping device 10 will be described.

That is, if vibration in the direction of the axis O is input to the vibration-damping device 10 as shown in FIG. 1 from the vibration generating part, both the attachment members 11 and 12 are displaced relative to each other, elastically deforming the elastic body 13, and the liquid pressure of the main liquid chamber 14 fluctuates. Depending on this fluctuation of the liquid pressure, the liquid L flows between the main liquid chamber 14 and the auxiliary liquid chamber 15 through the communication chamber 30.

Here, generally, vibration, such as idle vibration (for example, the frequency thereof 18 Hz to 30 Hz and the amplitude thereof is ±0.5 mm or less), or shake vibration (for example, the frequency thereof is 14 Hz or less, and the amplitude thereof is greater than ±0.5 mm) of which the frequency is lower than the idle vibration and the amplitude is greater than idle vibration, is input to this vibration-damping device 10. That is, although the idle vibration of these kinds of vibration has a relatively small amplitude but a relatively high frequency, the shake vibration has a low frequency but a large amplitude. Therefore, when such kinds of ordinary vibration are input, all the flow speeds of the liquid L that flows into the communication chamber 30 can be made faster than a fixed value.

Here, as shown in FIG. 3, when the liquid L within the main liquid chamber 14 flows toward the auxiliary liquid chamber 15 through the communication chamber 30, the flow speed of the liquid L becomes fast as mentioned above. Then, the liquid L that has flowed into the communication chamber 30 from the first communication holes 31 flows through the communication chamber 30 in the direction of the axis O, and reaches the second wall surface 30b, and the flow of the liquid L is changed by the second wall surface 30b. In this case, the flow of the liquid L changes so as to face the orthogonal direction along the second wall surface 30b, and then, the liquid L reaches the outer peripheral surfaces of the second protruding tube 32a. Then, the liquid L flows from the base ends of the second protruding tubes 32a toward the protruding end thereof along the outer peripheral surfaces of the second protruding tubes 32a. Then, due to the energy loss caused when the liquid L with the flow changed as described above and the liquid L that flows out from the inside of the communication chamber 30 through the second communication holes 32 to the auxiliary liquid chamber 15 collide against each other, the energy loss caused when the viscous resistance of the liquid L and the flow of the liquid L are changed, the energy loss caused by the friction between the liquid L and the second wall surface 30b, or the like, the pressure loss of the liquid L increases, and vibration is absorbed and damped.

In this case, if the liquid L within the auxiliary liquid chamber 15 flows toward the main liquid chamber 14 through the communication chamber 30, as mentioned above, the liquid L that has flowed into the communication chamber 30 from the second communication holes 32 flows through the communication chamber 30 in the direction of the axis O, and reaches the first wall surface 30a, and the flow thereof is changed by the first wall surface 30a. In this case, the flow of the liquid L changes so as to face the orthogonal direction along the first wall surface 30a. Thereafter, the liquid L reaches the outer peripheral surfaces of the first protruding tubes 31a, and flows from the base ends of the first protruding tubes 31a toward the protruding ends thereof along the outer peripheral surfaces of the first protruding tubes 31a. Then, the liquid L with the flow changed in this way, the liquid L that flows out from the inside of the communication chamber 30 through the first communication holes 31 to the main liquid chamber 14 collide against each other. Due to the energy loss or the like caused by this collision, the pressure loss of the liquid L increases, and vibration is absorbed and damped.

Meanwhile, for example, a fine vibration or the like having a higher frequency and an extremely smaller amplitude than assumed, may be unintentionally input to the vibration-damping device 10. Since the flow speed of the liquid L that flows into the communication chamber 30 is slow when a fine vibration is input, the pressure loss of the liquid L caused when the above liquids L collide against each other is limited. Therefore, since the liquid L passes through the communication chamber 30 and flows smoothly between the main liquid chamber 14 and the auxiliary liquid chamber 15, a rise in dynamic spring constant is limited.

As described above, according to the vibration-damping device related to the present embodiment, vibration can be absorbed and damped by increasing the pressure loss of the liquid L according to the flow speed of the liquid L that flows through the communication chamber 30. For example, when an ordinary vibration, such as an idle vibration or a shake vibration, is input, the vibration can be absorbed and damped regardless of the frequency of the vibration. Therefore, generation of abnormal noise can be limited and simplification of structure and facilitation of manufacture can be achieved, while absorbing and damping a plurality of kinds of vibration with mutually different frequencies.

Additionally, the liquid L passes smoothly through the communication chamber 30 and a rise in dynamic spring constant is limited in a state where flow speed is slow and the pressure loss of the liquid L is limited. Therefore, for example, when the flow speed of the liquid L is lower than that when an ordinary vibration is input, such as when an unintended vibration, such as a fine vibration having a higher frequency and an extremely smaller amplitude than an ordinary vibration, is input, it is possible to limit a rise in dynamic spring constant, and the product characteristics of this vibration-damping device can be easily guaranteed.

Additionally, the first communication hole 31 is formed by the inside of the first protruding tube 31a, and the second communication hole 32 is formed by the inside of the second protruding tube 32a. Therefore, if the flow speed of the liquid L that flows through the communication chamber 30 between the main liquid chamber 14 and the auxiliary liquid chamber 15 becomes fast, both when the liquid L flows from the main liquid chamber 14 through the communication chamber 30 to the auxiliary liquid chamber 15 and when the liquid L flows from the auxiliary liquid chamber 15 through the communication chamber 30 to the main liquid chamber 14, it is possible to increase the pressure loss of the liquid L, and vibration can be reliably absorbed and damped.

Additionally, the outer peripheral surface of the first protruding tube 31a gradually decreases in diameter from the base end of the first protruding tube 31a toward the protruding end thereof. Therefore, when the liquid L with the flow speed which has become fast flows into the communication chamber 30 from the second communication hole 32, it is possible to make this liquid L flow smoothly from the base end of the first protruding tube 31a toward the protruding end thereof along the outer peripheral surface of the first protruding tube 31a, and the pressure loss of the liquid L can be reliably increased.

Moreover, in the present embodiment, the outer peripheral surface of the second protruding tube 32a gradually decreases in diameter from the base end of the second protruding tube 32a toward the protruding end thereof. Therefore, when the liquid L with the flow speed which has become fast flows into the communication chamber 30 from the first communication hole 31, it is possible to make this liquid L flow smoothly from the base end of the second protruding tube 32a toward the protruding end thereof along the outer peripheral surface of the second protruding tube 32a, and the pressure loss of the liquid L can be reliably increased.

Additionally, in the present embodiment, since the first protruding tube 31a and the second protruding tube 32a overlap each other in the direction of the axis O, the energy loss caused by the collision of the liquid L can be reliably increased.

In addition, the technical scope of the invention is not limited to the present embodiment, and various changes can be made without departing from the concept of the invention.

In the present embodiment, the outer peripheral surface of the first protruding tube 31a gradually decreases in diameter from the base end of the first protruding tube 31a toward the protruding end thereof. Additionally, the outer peripheral surface of the second protruding tube 32a gradually decreases in diameter from the base end of the second protruding tube 32a toward the protruding end thereof. However, the invention is not limited to this. For example, the outer peripheral surface of the first protruding tube 31a may have the same diameter over the entire length of this protruding tube. Additionally, the outer peripheral surface of the second protruding tube 32a may have the same diameter over the entire length of this protruding tube.

Moreover, in the present embodiment, the first protruding tube 31a and the second protruding tube 32a overlap each other in the direction of the axis O, the first protruding tube 31a and the second protruding tube 32a may be spaced apart from each other.

Moreover, in the present embodiment, both of the first protruding tube 31a and the second protruding tube 32a are included. However, the invention is not limited to this. For example, at least one of the first protruding tube 31a or the second protruding tubes 32a may be provided.

Additionally, in the present embodiment, the main liquid chamber 14 is provided on a first side of the partitioning member 16 and the auxiliary liquid chamber 15 is provided on a second side thereof. However, the invention is not limited to this. For example, the auxiliary liquid chamber serving as the first liquid chamber may be provided on first side of the partitioning member 16, and the main liquid chamber serving as the second liquid chamber may be provided on the second side thereof.

Moreover, in the present embodiment, the partitioning member 16 is configured to partition the liquid chamber within the first attachment member 11 into the main liquid chamber 14 having the elastic body 13 on a portion of the wall surface thereof, and the auxiliary liquid chamber 15. However, the invention is not limited to this. For example, a pair of the elastic bodies 13 may be provided in the direction of the axis instead of the diaphragm, 17 or a pressure-receiving liquid chamber having the elastic body 13 on a portion of the wall surface thereof may be provided instead of the auxiliary liquid chamber 15.

That is, the partitioning member 16 may be appropriately changed to another configuration in which the liquid chamber within the first attachment member 11 in which a liquid is enclosed is split into the first liquid chamber 14 and the second liquid chamber 15, and at least one of both the liquid chambers of the first liquid chamber 14 and the second liquid chamber 15 has the elastic body 13 on a portion of the wall surface thereof.

Additionally, although a case where an engine is connected to the second attachment member 12 and the first attachment member 11 is connected to a vehicle body has been described in the present embodiment, contrary to this, the engine may be connected to the first attachment member 11 and the second attachment member 12 may be connected to the vehicle body.

Moreover, the vibration-damping device 10 related to the invention is not limited to engine mounts of vehicles and can also be applied to those other than the engine mounts. For example, it is also possible to apply the invention to mounts for power generators loaded on construction machines. Otherwise, it is also possible to apply the invention to mounts of machines installed in factories or the like.

In addition, the constituent elements in the present embodiment can be substituted with well-known constituent elements without departing from the scope of the invention. Additionally, the above-described modifications may be appropriately combined.

INDUSTRIAL APPLICABILITY

A vibration-damping device that can limit generation of abnormal noise and achieve simplification of structure and facilitation of manufacture, while guaranteeing product characteristics, is provided.

REFERENCE SIGNS LIST

10: Vibration-Damping Device
11: First Attachment Member
12: Second Attachment Member
13: Elastic Body
14: Main Liquid Chamber
15: Auxiliary Liquid Chamber
16: Partitioning Member
30: Communication Chamber
30a: First Wall Surface
30b: Second Wall Surface
31: First Communication Hole
31a: First Protruding Tube
32: Second Communication Hole
32a: Second Protruding Tube
L: Liquid

The invention claimed is:

1. A vibration-damping device comprising:
a tubular first attachment member coupled to any one of a vibration generating part and a vibration receiving part, and a second attachment member coupled to the other thereof;
an elastic body coupling both of the attachment members; and
a partitioning member that partitions a liquid chamber within the first attachment member having a liquid enclosed therein into a first liquid chamber and a second liquid chamber,
wherein at least any one of the first liquid chamber and the second liquid chamber has the elastic body on a portion of a wall surface thereof,
wherein the partitioning member is provided with a communication chamber that allows the first liquid chamber and the second liquid chamber to communicate with each other,
wherein a first wall surface and a second wall surface that face each other with the communication chamber disposed therebetween among wall surfaces that form the communication chamber in the partitioning member are separately provided with communication holes that open toward the communication chamber,
wherein a first communication hole that is provided in the first wall surface and allows the communication chamber and the first liquid chamber to communicate with each other, and a second communication hole that is provided in the second wall surface and allows the communication chamber and the second liquid chamber to communicate with each other are provided as the communication holes, wherein the first communication hole and the second communication hole are arranged to be offset from each other in an orthogonal direction orthogonal to a facing direction in which the first wall surface and the second wall surface face each other, wherein the first communication hole is formed by the inside of a first protruding tube that protrudes into the communication chamber from the first wall surface, and wherein the second communication hole is formed by the inside of a second protruding tube that protrudes into the communication chamber from the second wall surface.

2. The vibration-damping device according to claim 1, wherein an outer peripheral surface of the first protruding tube gradually decreases in diameter from a base end of the first protruding tube toward a protruding end thereof.

\* \* \* \* \*